Patented Sept. 19, 1950

2,522,535

UNITED STATES PATENT OFFICE 2,522,535

TREATMENT OF FRUITS AND VEGETABLES

Dean Earl Pryor, Whittier, Calif., assignor to Wallace & Tiernan Products Corporation, Belleville, N. J., a corporation of New Jersey No Drawing. Application March 17, 1947, Serial No. 735,249

15 Claims. (Cl. 99—154)

This invention is concerned with the treatment of surfaces of raw fruits and vegetables to inhibit decay during shipment and storage and provides improvements to this end. More specifically, the invention provides an improved treatment employing chlorine under certain controlled conditions hereinafter set forth.

It has been proposed heretofore to sterilize sewage and other aqueous liquids containing finely divided organic matter by treatment with gaseous chlorine in low concentrations, say about 10 parts per million, the active agents in such case being chloramines formed in the solution by reaction with nitrogenous substances. The action of chloramines is comparatively slow, and sewage treatment processes involving such action are of necessity of long duration.

More recently it has been proposed to treat fruits and vegetables with a strong and basic aqueous hypochlorite solution with a view toward inhibiting decay during shipment and storage. The proposed treatment solutions are strong, containing 3,000 to 33,000 parts per million of chlorine in the form of the hypochlorous radical and extremely basic, with a pH ranging from about 10 to 11 or above. In some cases, such hypochlorite treatment is apparently effective. In other cases, it appears to have stimulated decay.

As a result of my investigations, I have discovered that gaseous chlorine, when employed under certain controlled conditions, is superior to hypochlorite in the treatment of surfaces of certain fruits and vegetables. Thus I have discovered that washing the surfaces of raw fruits and vegetables with an acid aqueous solution of gaseous chlorine, with a chlorine concentration ranging from about 25 to about 250 parts per million and with a hydrogen ion concentration ranging from about 4 to about 6, reduces or eliminates contamination by infectious organisms on the surfaces of the fresh fruits and vegetables and greatly reduces shipment losses. During the washing treatment, the concentrations of chlorine and of hydrogen ion must be maintained within the foregoing limits, preferably by circulation of the treating solution and with continuous addition of chlorine. In rare instances, the plant refuse or earth which accompanies the fruit or vegetables to the washing process may result in maintenance of the proper hydrogen ion concentration by buffering action. In most cases, a buffer such as calcium carbonate or an alkali such as sodium hydroxide must be added for hydrogen ion control, and in very rare instances, as for example, when potatoes are grown in very alkaline soil and carry considerable earth to the washing pit, it may be necessary to add an acid agent to maintain the pH in the prescribed range.

The average treatment time should range from about 1 to about 10 minutes, and the solution temperature should be tap temperature or lower, i. e. 25° C. or less. This is in marked contrast to many fruit washing processes, such for example, as washing with a borax solution or with an alkaline hypochlorite solution which require higher temperatures to be effective. In the process of the invention, low temperatures are desirable not only because they are attained more cheaply than high temperatures, but also because low temperatures reduce the opportunity for development of deep seated infections and also reduce the development of obnoxious odors, such as are encountered in the alkaline hypochlorite washing of asparagus.

As indicated by the short treatment time required, the process of the invention is such that the chlorine employed operates rapidly upon the organisms which it is employed to control. With such short killing time, disease organisms are prevented from spreading in the wash.

Thus far, the process of the invention has found its major application in the treatment of potatoes and can be adapted as an adjunct to a pit washing operation. Thus, potatoes are dumped either continuously or in batches into a pit containing a large volume of treatment solution, and the washed potatoes are more or less continuously withdrawn by a conveyor or the like. In accordance with the invention, as applied to the treatment of potatoes, the solution in the pit is circulated by means of a pump or the like while the proper pH and chlorine concentrations are maintained by suitable addition of reagents.

The process is also effective in the treatment of peas, celery, asparagus and tomatoes, and to a somewhat lesser extent in the treatment of citrus fruit. It is applicable to beans, peppers, corn, carrots, cantaloupe and other melons and crucifers, such as broccoli, cabbage and Brussels sprouts.

There is some indication that the process is not desirable in the treatment of certain green leafy vegetables, including chickory, endive, salsify and lettuce, the term lettuce being employed to include the curled, leaf, cos, head, and asparagus varieties. In the treatment of the invention as applied to certain green leafy vegetables, the chlorine (while exerting its killing effect upon microorganisms) also penetrates cell walls and thus exerts a bleaching action upon the chlorophyll of the leaves, thus damaging appearance. It should be noted, however, that green waxy fruits and vegetables, for example, peas, are benefited by the process of the invention with no bleaching effect on the chlorophyll in uninjured cells.

Wetting agents should be employed in the solution in the cases in which the surface condition of the fruit or vegetable warrants treatment to decrease surface tension. Thus, in the treatment of waxy fruits and vegetables, it may be desirable to employ anionic wetting agents in concentrations in the neighborhood of .1% or less i. e., in concentrations that are not per se toxic or do not form toxic films on the product. Sulphonated kerosenes and similar substances are preferred agents, for example, in the treatment of tomatoes, citrus, corn, cantaloupe and peas, in accordance with the invention.

The process of the invention can be carried out in customary washing equipment, for example, in the conveyor equipped pits used for potato washing. The treatment is rapid and can be carried on simultaneously with the removal of solids, such as the earth which adheres to potatoes.

It has been customary heretofore to wash many fruits and vegetables prior to icing and shipment in a so-called "hydro cooler." In such apparatus, the fruit or vegetable undergoing treatment is carried forward on a conveyor underneath a perforated screen through which a rain of cold water falls. After contact with the agricultural product being treated, the water is recovered in a tank or the like and recirculated after cooling, for example, by passing in direct contact with ice. In accordance with the invention, an aqueous acid solution of gaseous chlorine having a chlorine concentration and hydrogen ion concentration within the stated ranges is employed in place of the water.

Tomatoes may be washed by being carried on a conveyor which dips in and out of a washing tank. For the practice of the invention, this washing tank should be equipped with a pump or the like to maintain circulation of the treating solution, chlorine, (with or without acid or alkali) being added in such amounts as to maintain proper concentration and pH.

The following table represents the results obtained in the laboratory treatment of potatoes in accordance with the invention, results obtained without treatment and by washing with solutions having insufficient or excessive pH being included for comparison. In all cases, the potatoes which were "new," were first wounded and innoculated with soft rot bacteria and thereafter treated at 18° C. for five minutes with the aqueous solutions indicated in the table.

Table

| Treatment | Per cent decay |
| --- | --- |
| None | 67.5 |
| 25 P. P. M. Cl$_2$ pH 2.25 | 26.7 |
| 25 P. P. M. Cl$_2$ pH 4.0 | 10.8 |
| 25 P. P. M. Cl$_2$ pH 6.0 | 9.2 |
| 25 P. P. M. Cl$_2$ pH 9.0 | 23.3 |

It will be observed that with the untreated potatoes, there was a decay of 67.5%. Treatment with aqueous solutions of gaseous chlorine at concentrations of 25 parts per million, but with hydrogen ion concentration of pH 2.5, i. e. outside the range of the invention, gave a decay of 26.7%; and with the same chlorine concentration but with a pH of 9 above the range of the invention, the decay rate was 23.3%. These results are in marked contrast with the practice of the invention in a pH range of 4 to 6 for which the decay rate ranged from 9.2% to 10.8%. It is evident that hydrogen ion concentrations both above and below the specified range give markedly inferior results.

In a large scale treatment of potatoes according to the invention, these were dumped as they came from the field into a washing pit having a capacity of about 5,000 gallons of treatment solution. During the treatment operation, the pH of the solution was maintained at about 5 with the chlorine concentration ranging from about 25 to 50 parts per million. The temperature of the solution varied from about 18 to 22° C. and the circulation rate was about 100 gallons per minute, this being maintained by means of a pump which withdrew solution from below the liquid level and returned it above. At any one time, some two to three tons of potatoes were undergoing treatment in the pit, the treatment time being 3 to 4 minutes on the average, although some potatoes which escaped the conveyor employed for continuously withdrawing the washed product may have stayed in the pit as long as an hour. Chlorine was added continuously as gaseous chlorine from a cylinder, and the consumption was about 80 pounds of chlorine for 24 hours, or say 2¼ pounds of chlorine per ton of potatoes. It was unnecessary to add extraneous alkali or acid to maintain the hydrogen ion concentration within the required range, since the soil which accompanied the potatoes exerted a buffering action and maintained the pH at about 5.

The chlorine consumption was some 15 to 20 times the calculated theoretical, i. e. the amount required for the desired concentration of a solution which carried no demand for chlorine.

Some 650 carloads of potatoes were treated as described immediately above and shipped to all parts of the United States, the shipment time being as much as 14 days. Decay, and this minor, was only reported in the case of three cars. During the same period, similar potatoes shipped after water wash alone in the same type of equipment arrived at destination with decay rates as high as 60%.

The following experimental results were obtained in the sterilization of the surfaces of lemons in accordance with the process of the invention. In all cases, the lemons were first dipped in a spore suspension containing a mixture of blue and green mold (*Penicillium italicium* and *Penicillium digitatum*). The lemons thus contaminated were next dried, and wounded just prior to treatment. The wound was made with a .3 mm. diameter cork borer to a depth of 1 to 2 mm. Thereafter, the lemons were submerged for five minutes in the aqueous treatment solutions indicated in the following table. In all cases, the treatment solutions contained 250 parts per million of chlorine added as gaseous chlorine. Five treatment solutions were employed at respectively pH 2, pH 4, pH 6, pH 8 and pH 10. 130 lemons were employed for each solution. The percentage of infected lemons resulting each case are given in the table.

| Case No. | 1 | 2 | 3 | 4 | 5 | blank |
|---|---|---|---|---|---|---|
| Hydrogen ion Concentration | pH2 | pH4 | pH6 | pH8 | pH10 | (¹) |
| Percentage of infected lemons (Total number 128) | 83.0 | 67.7 | 62.4 | 71.6 | 90.8 | 98.4 |

¹ No treatment.

It will be observed from the data obtained that treatment at 250 parts per million chlorine and at pH's of 4 and 6 gave markedly superior results.

The test reported above is a severe one, since the opportunity for infection was purposely made much greater than is the case in actual practice in usual laboratory tests. It will be observed that although treatment with chlorine at 250 parts per million outside the pH range of the invention gave some improvement as compared with no treatment at all (126 decay examples out of 130), the treatment in the range of the invention was markedly more effective.

The process of the invention possesses outstanding advantages and already has resulted in great savings of agricultural products which heretofore have been lost in shipment or storage. To summarize the advantage:

1. The process is rapid and consequently there is less opportunity for the spread of disease organisms in the wash from infected fruit to uninfected fruit.

2. The chlorine is used at low concentrations, and consumption is small so that treatment is inexpensive.

3. The process can be employed in existing washing equipment, so that practically no additional construction cost is required.

4. Fuming with certain products is less than when hypochloride is employed.

5. Equipment corrosion is greatly reduced, since corrosion due to chlorine at the concentration which is employed is practically negligible, while acidity is also low with consequent little attack upon iron or steel, in fact much less than is the case with the strongly basic solutions employed in the aforementioned hypochloride treatment.

6. Because of the low concentrations of treatment chemicals, the treatment of the invention leaves no toxic residue on the washed product, so no rinse is required. In fact a rinse preferably is not used in order to prolong the protection afforded by the wash.

7. By maintaining the pH between 4 and 6, there is no danger of toxicity in the treated product.

8. Highly developed machinery makes possible very close control of chlorine concentration. Machinery for feeding $Cl_2$ is more accurate than that used for feeding hypochlorite.

9. Since chlorine can be handled simply in metal cylinders and loses no strength on storage, it is superior to strong aqueous solutions of hypochlorite which require addition in refractory containers and which lose strength rapidly upon standing.

Although improved results are generally obtained with a chlorine concentration ranging from 25 to 250 parts per million, optimum results with certain agricultural products are obtained at specific concentrations within this range. Thus optimum results are obtained with potatoes at chlorine concentrations ranging from 25 to 75 parts per million, while concentrations in the neighborhood of 250 parts per million are optimum for lemons and other citrus fruits.

It should be observed that in the usual practice of the invention, the bulk of the treating solution remains substantially constant in volume, being made up only to the extent that volume is lost through entrainment or evaporation. The result of chlorine addition to this bulk of solution is very different from the result of addition of the same chlorine to a flowing stream of water which is not circulated or returned. Thus, if chlorine were added to a flowing uncirculated stream of water having a pH of about 7, concentrations of 25 to 250 parts per million would automatically result in the formation of sufficient HCl and HOCl to establish a pH ranging between 7 and say 3, and it would not be necessary to employ a neutralizing agent. However, in the practice of the invention, more and more chlorine is added to the same body of solution, and hydrolysis would result in high acidity far out of the range of 4 to 6 if a buffering or neutralizing action did not occur. For example when no pH adjusting reagent was added to the solution in a corn hydrocooler running at 150 p. p. m. of chlorine the pH dropped to 2.7 and in a potato washing pit operating at 60 p. p. m. of chlorine the pH dropped to 2.25. Occasionally, the plant refuse or the earth which accompanies the fruits and vegetables to the washing operation is of such character that it exerts the necessary neutralizing or buffering action. However, usually fruits or vegetables introduced to the treatment require substantial neutralization from exterior reagents to maintain the requisite pH.

The action of the treatment solution in the practice of the invention upon the surfaces of fruits and vegetables is clearly distinguishable from the chlorine treatment of organic matter suspended in sewage and the like, and also from the use of hypochlorite in alkaline solution for fruit washing. In the treatment of sewage, the nitrogenous substances present are far in excess of those necessary to convert all of the chlorine added to chloramine. Consequently, this latter compound is present rather than colecular chlorine, although the bactericidal action of the latter, were it present, would proabably be high and rapid. The treatment of the invention at a pH of 4 to 6 is probably effective due to the presence not of chloramines nor of molecular chlorine but to hypochlorous acid. Hypochlorous acid will exist in aqueous solutions at hydrogen ion concentrations in excess of 4 until the solution becomes alkaline, i. e. slightly above pH 7. At these pH's, molecular chlorine is not present unless there be an excessive chloride concentration which shifts the equilibrium between molecular chlorine and HOCl. Since fresh water ordinarily is used in the washing operation of the invention, the chloride concentration is not high enough to affect the equilibrium to this degree, and consequently the chlorine, although introduced as gaseous chlorine, is probably all present as hypochlorous acid.

Despite the existence of evidence that molecular chlorine is slightly more bactericidal than HOCl, it appears that the effectiveness of the process of the invention decreases when, due to high chloride concentration or other factors, molecular chlorine is present. This is probably because the molecular chlorine alters the host tissue on the surfaces of the fruit or vegetables so that the HOCl does not, under such conditions, reach the parasite to be controlled. Whatever be

I claim:

1. In the treatment of fresh fruits and vegetables, the improvement which comprises washing the surfaces thereof in an aqueous acid solution having its pH maintained in the range of about 4 to 6 and its chlorine concentration maintained in the range of about 25 to 250 parts per million the chlorine being present in the solution substantially in the form of hypochlorous acid.

2. In the treatment of fresh fruits and vegetables, the improvement which comprises washing the surfaces thereof in a circulating aqueous acid solution having its pH maintained in the range of about 4 to 6 and its chlorine concentration maintained in the range of about 25 to 250 parts per million the chlorine being present in the solution substantially in the form of hypochlorous acid.

3. In the treatment of fresh fruits and vegetables, the improvement which comprises washing the surfaces thereof in an aqueous acid solution having its pH maintained in the range of about 4 to 6 and its chlorine concentration maintained in the range of about 25 to 250 parts per million by the addition of gaseous chlorine the chlorine being present in the solution substantially in the form of hypochlorous acid.

4. In the treatment of fresh fruits and vegetables, the improvement which comprises washing the surfaces thereof in a circulating cold aqueous acid solution having its pH maintained in the range of about 4 to 6 and its chlorine concentration maintained in the range of about 25 to 250 parts per million by the addition of gaseous chlorine the chlorine being present in the solution substantially in the form of hypochlorous acid.

5. In the treatment of fresh fruits and vegetables, the improvement which comprises washing the surfaces thereof in a cold aqueous acid solution having its pH maintained in the range of about 4 to 6 and its chlorine concentration maintained in the range of about 25 to 250 parts per million by the addition of gaseous chlorine, while refrigerating the solution and maintaining circulation therein the chlorine being present in the solution substantially in the form of hypochlorous acid.

6. In the treatment of an agricultural product selected from the group which consists of fresh fruits and vegetables, the improvement which comprises washing the surface of the product in a circulating aqueous acid solution with temperatures not in excess of tap temperatures, the pH solution being maintained in the range of about 4 to 6 and the chlorine concentration being maintained in the range of about 25 to 250 parts per million by the addition of gaseous chlorine the chlorine being present in the solution substantially in the form of hypochlorous acid.

7. Process according to claim 6 in which the surface of the product is washed for an average time ranging from about 1 to about 10 minutes.

8. In the treatment of frush fruits and vegetables, the improvement which comprises washing the surface of the product in a circulating aqueous acid solution having its pH maintained in the range of about 4 to 6 and its chlorine concentration maintained in the range of about 25 to 250 parts per million by the addition of gaseous chlorine the chlorine being present in the solution substantially in the form of hypochlorous acid, draining the product thus washed and permitting the surface of the drained product to dry without rinsing.

9. In the treatment of fresh fruits and vegetables having waxy surfaces, the improvement which comprises washing the surface of the product in a circulating aqueous acid solution containing an anionic wetting agent, the pH of the solution being maintained during treatment in the range of about 4 to 6, and the chlorine concentration being maintained during treatment in the range of about 25 to about 250 parts per million by the addition of gaseous chlorine the chlorine being present in the solution substantially in the form of hypochlorous acid.

10. In the treatment of fresh fruits and vegetables, the improvement which comprises washing the surfaces thereof with an acid aqueous solution of gaseous chlorine in the form of HOCl and having a pH ranging from about 4 to 6 and a chlorine concentration ranging from about 25 to 250 parts per million, and maintaining the chlorine concentration within the foregoing limits by subjecting the solution to circulation while adding gaseous chlorine thereto the chlorine being present in the solution substantially in the form of hypochlorous acid.

11. In the treatment of fresh fruits and vegetables, the improvement which comprises washing the surfaces thereof with an acid aqueous solution of gaseous chlorine having a pH ranging from about 4 to 6 and with a chlorine concentration ranging from about 25 to 250 parts per million the chlorine being present in the solution substantially in the form of hypochlorous acid, maintaining the chlorine concentration within the foregoing limits by subjecting the solution to circulation while adding gaseous chlorine, and maintaining the pH within its aforementoned range by adding a base to the solution during the circulation.

12. In the treatment of fresh fruits and vegetables, the improvement which comprises washing the surfaces thereof with an acid aqueous solution of gaseous chlorine having a pH ranging from about 4 to 6 and with a chlorine concentration ranging from about 25 to 250 parts per million the chlorine being present in the solution substantially in the form of hypochlorous acid, maintaining the chlorine concentration within the foregoing limits by subjecting the solution to circulation while adding gaseous chlorine, and maintaining the pH within its aforementoned range by adding an acid to the solution.

13. In the treatment of fresh fruits and vegetabes, the improvement which comprises washing the surfaces thereof with an acid aqueous solution of gaseous chlorine having a pH ranging from about 4 to 6 and with a chlorine concentration ranging from about 25 to 250 parts per million the chlorine being present in the solution substantially in the form of hypochlorous acid, maintaining the chlorine concentration within the foregoing limits by subjecting the solution to circulation while adding gaseous chlorine, and maintaining the pH within its aforementioned range by adding a buffer to the solution.

14. In the treatment of raw potatoes, the improvement which comprises washing the surfaces thereof with an acid aqueous solution of gaseous chlorine with a pH ranging from about 4 to 6 and with a chlorine concentration ranging from about 25 to 75 parts per million the chlorine being present in the solution substantially in the form of hypochlorous acid.

15. In the treatment of raw citrus fruits, the combination which comprises washing the surface of the fruit with an acid aqueous solution of gaseous chlorine with a pH ranging from about 4 to 6 and with a chlorine concentration of about 250 parts per million the chlorine being present in the solution substantially in the form of hypochlorous acid.

DEAN EARL PRYOR.

REFERENCES CITED

The following references are of record in the file of this patent:

UNITED STATES PATENTS

| Number    | Name   | Date          |
|-----------|--------|---------------|
| 2,003,589 | Sharma | May 28, 1935  |
| 2,332,151 | Kalmar | Oct. 19, 1943 |
| 2,417,933 | Kalmar | Mar. 25, 1947 |

FOREIGN PATENTS

| Number  | Country       | Date          |
|---------|---------------|---------------|
| 173,285 | Great Britain | Dec. 20, 1921 |

OTHER REFERENCES

Chem. Abstracts, vol. 26, page 4355.

McCulloch "Disinfection and Sterilization," page 338, Lea & Febiger, Phila., Aug. 1946.

Porter: "Bacterial Chemistry and Physiology," page 287, Wiley and Sons, New York, 1946.